Feb. 11, 1930.　　　L. C. WETZEL　　　1,746,375
SHAFT HOLDING DEVICE
Filed July 16, 1926
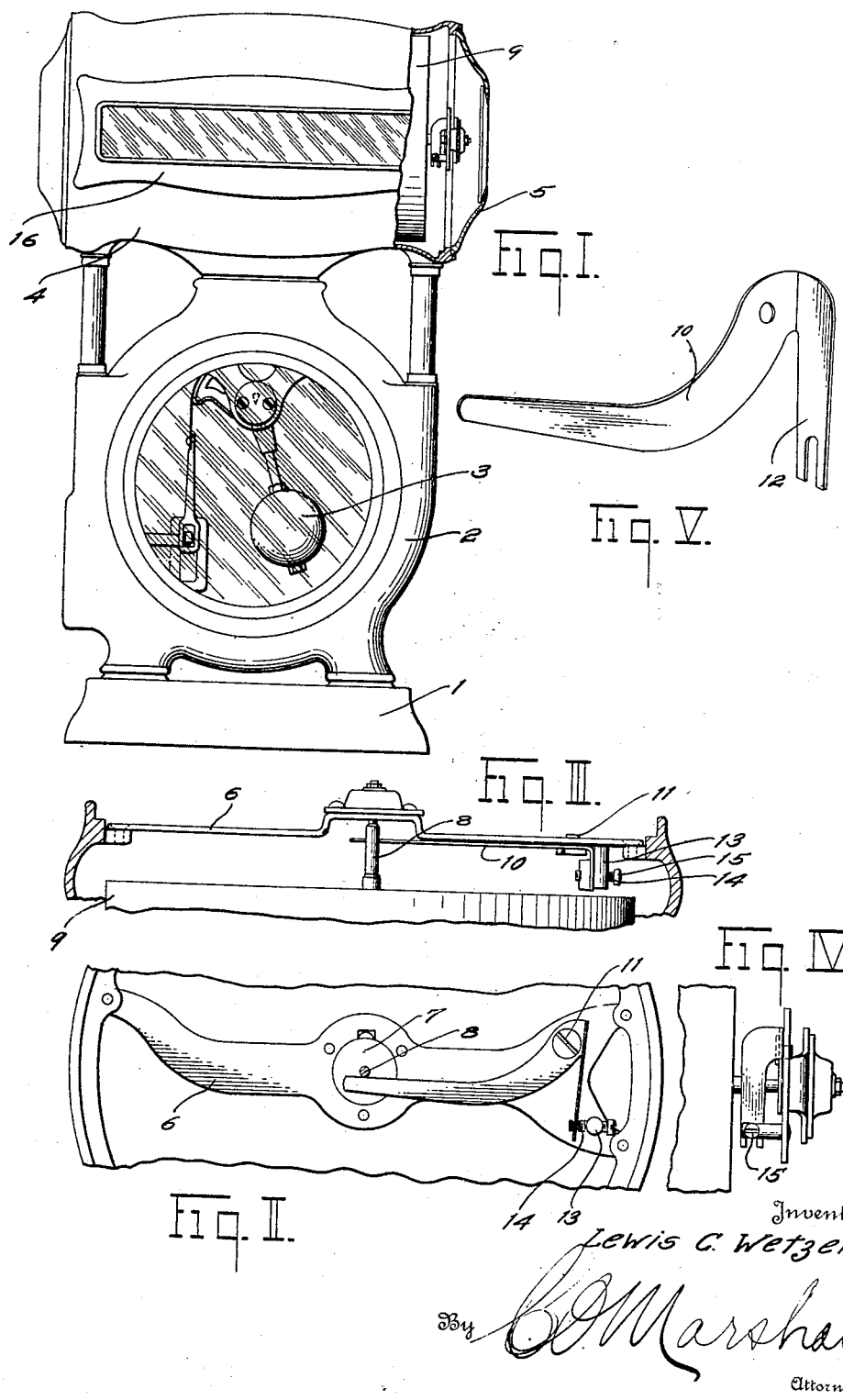
Inventor
Lewis C. Wetzel
By C. J. Marshall
Attorney Patented Feb. 11, 1930

1,746,375

UNITED STATES PATENT OFFICE

LEWIS C. WETZEL, OF TOLEDO, OHIO, ASSIGNOR TO TOLEDO SCALE COMPANY, OF TOLEDO, OHIO, A CORPORATION OF NEW JERSEY

SHAFT-HOLDING DEVICE

Application filed July 16, 1926. Serial No. 122,852.

This invention relates to devices for preventing vibration or rattling of shafts in their bearings, and particularly to devices for preventing such vibration or rattling of indicator shafts of weighing scales. The indicator shafts of weighing scales which are journaled in ball bearings must be capable of turning without appreciable friction. The portion of the shaft which engages the bearing balls, the balls themselves and the ball races are often lapped and polished to a high degree of smoothness. It has been found, however, that during transportation, where, for example, the scale is hauled for a long distance in a freight car or where it is carried about a salesman's territory in an automobile to be used for purposes of demonstration, the vibration to which it is subjected is liable to have a peening effect, causing the surfaces of the shaft and races to become pitted, so that unhampered and frictionless operation of the shaft in its bearings is prevented. It is an object of this invention to provide means for holding the shaft tightly against one side of the bearing and thereby prevent the hammering action which results from the rattling about of the shaft during transportation.

The portions of weighing scale indicator shafts which engage the bearings are usually small, and any considerable force exerted laterally on the shaft is liable to bend or break it where it passes into the bearing. It is another object of this invention to provide shaft holding means capable of holding the shaft against one side of its bearing with sufficient force to prevent it from rattling about during transportation but which is so constructed and arranged that it cannot exert pressure on the shaft sufficient to bend or break it.

Another object of the invention is to provide a chart shaft holding device which may be quickly and conveniently moved into and out of operative position.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a weighing scale having a chart shaft holding device of my invention applied to its indicator shaft, a part of the scale housing being broken away to show the chart shaft holding device;

Figure II is an enlarged fragmentary side elevational view of a portion of a weighing scale housing showing the chart shaft bearing bracket with a chart shaft holding device applied thereto;

Figure III is an enlarged fragmentary plan view showing some of the parts illustrated in Figure II;

Figure IV is a front elevational view of a chart bearing bracket with the chart shaft holding device in place thereon, a part of the chart and shaft being also illustrated; and Figure V is a further enlarged perspective view of the principal element of my chart shaft holding device.

Referring to the drawings in detail, the weighing scale in connection with which I have shown my chart shaft holding device is of the well known pendulum cylinder type, having a base 1 upon which is mounted an upright housing 2 carrying automatic load-counterbalancing mechanism 3 and supporting a chart casing 4, the ends of which are closed by casing ends 5.

Within the chart casing 4 and secured at its ends in the manner illustrated in Figures II and III are bearing brackets 6 on which are mounted ball bearing casings 7 containing bearing balls and ball races (not shown). Journaled in the ball bearings is a shaft 8 which supports an indicating chart 9, the chart shaft being connected to the lever mechanism of the scale by means of a rack and pinion (not shown). The end of the shaft which is journaled in the ball bearings is reduced in size, as shown in Figure III, in order that it may turn in its bearings with the least possible friction.

The shaft holding device consists of an arm 10 pivotally mounted, as at 11, on the bearing bracket 6 and provided with a downwardly extending bifurcated finger 12, the arm 10 and finger 12 being integraly formed of sheet steel or other resilient metal, so that together they form a resilient bell-crank lever. A stud 13 is secured to the bearing bracket 6 adjacent the bifurcated end of the finger 12 and threaded through the stud 13 is a screw 14, the end of which is provided with an annular groove and received between the bifurcations of the finger 12, as shown in Figure II. The head 15 of the screw extends toward a detachable opening cover 16 in the rear of the chart casing 4, so that when the cover 16 is removed the screw may be turned back to disengage the arm 10 from the chart shaft 8 or turned up to bring the arm into lifting engagement with the shaft. Owing to the fact that the finger 12 is resilient, it will yield to the movement of the screw 14 after the chart shaft 8 has been lifted into engagement with the ball bearings, so that when the screw is turned completely in the shaft will not be bent or broken. The stiffness of the metal from which the arm 10 and the finger 12 are formed is great enough so that the chart shaft is held in firm engagement with its bearing even when the scale is subjected to the severest shaking that it is liable to receive during transportation, but it is not stiff enough to permit the shaft, the bearing balls or the race to be injured when the screw 14 is turned up.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a bearing, a shaft supported thereby, means engageable with and disengageable from said shaft for forcing said shaft into engagement with said bearing, means for moving said shaft forcing means into engaging or disengaging position, and means to limit the pressure of said shaft forcing means on said shaft.

2. In a device of the class described, in combination, a bearing, a shaft supported thereby, a resilient member engageable with said shaft, and means for adjusting the position of said resilient member to engage it with or disengage it from said shaft.

3. In a device of the class described, in combination, a frame, a bearing mounted in said frame, a shaft journaled in said bearing, a lever of resilient material fulcrumed on said frame, one arm of said lever being engageable with said shaft, and means engaging the other arm of said lever for moving the first said arm into and out of engagement with said shaft.

4. In a device of the class described, in combination, a frame, a bearing mounted in said frame, a shaft journaled in said bearing, a bell-crank lever of resilient material fulcrumed on said frame, one arm of said lever being engageable with said shaft, and means engaging the other arm of said lever for moving the first said arm into and out of engagement with said shaft.

5. In a device of the class described, in combination, a frame, a bearing mounted therein, a shaft journeled in said bearing, a bell-crank lever fulcrumed on said frame, one arm of said bell-crank lever being adapted to be brought into engagement with said shaft, the other end of said bell-crank lever being resilient, and a screw engageable with the resilent arm of said bell-crank lever for moving the other arm thereof into engagement with said shaft.

6. In a device of the class described, in combination, a frame, a bearing mounted therein, a shaft journaled in said bearing, a resilient element engageable with and disengageable from said shaft, and screw means for moving said resilient element into engagement with said shaft or out of engagement therewith whereby said shaft is yieldingly forced against one side of its bearing or freed for substantially frictionless rotation.

7. In a weighing scale, in combination, a chart casing, chart shaft bearings mounted therein, a chart shaft journaled in said bearings, a resilient member engageable with and disengageable from said chart shaft, means for moving said resilient member into engagement with said chart shaft or out of engagement therewith, said casing having an opening through which said resilient member moving means is accessible.

8. In a weighing scale, in combination, a chart casing, a chart shaft mounted therein, resilient means engageable with said chart shaft, a screw for moving said resilent means into engagement with said chart shaft and thereby yieldably pressing said chart shaft against one side of its bearing or removing said resilient means from engagement with said chart shaft, said chart casing having an opening, said screw having a head, the head of said screw being accessible through the opening in said chart casing.

LEWIS C. WETZEL.